United States Patent [19]

Asboth

[11] Patent Number: 4,927,330
[45] Date of Patent: May 22, 1990

[54] AIR PROPELLER

[76] Inventor: Oscar Asboth, Schlösselgasse 2, A-1080 Vienna, Austria

[21] Appl. No.: 212,049

[22] Filed: Jun. 24, 1988

Related U.S. Application Data

[63] Continuation-in-part of Ser. No. 916,813, Oct. 8, 1986, abandoned, which is a continuation-in-part of Ser. No. 641,451, Aug. 16, 1984, abandoned.

[30] Foreign Application Priority Data

Aug. 17, 1983 [AT]  Austria .................................. 2949/83

[51] Int. Cl.$^5$ .............................................. B64C 11/18
[52] U.S. Cl. ........................... 416/223 R; 416/DIG. 2
[58] Field of Search ............. 416/223 R, 228, DIG. 2, 416/DIG. 5, 238

[56] References Cited

U.S. PATENT DOCUMENTS

| | | | |
|---|---|---|---|
| 3,635,590 | 1/1972 | Phillips | 416/223 |
| 3,697,193 | 10/1972 | Phillips | 416/223 |
| 4,046,489 | 9/1977 | Fairchild | 416/DIG. 2 |
| 4,135,858 | 1/1979 | Entat | 416/223 |
| 4,347,038 | 8/1982 | Hayashi et al. | 416/DIG. 2 |
| 4,392,781 | 7/1983 | Mouille et al. | 416/DIG. 2 |
| 4,431,376 | 2/1984 | Luberstein et al. | 416/223 |
| 4,452,411 | 6/1984 | Eickmann | 416/DIG. 2 |
| 4,564,337 | 1/1986 | Zimmer et al. | 416/223 |
| 4,744,728 | 5/1988 | Lednicer et al. | 416/223 R |

FOREIGN PATENT DOCUMENTS

| | | | |
|---|---|---|---|
| 8765 | 1/1933 | Austria | 416/DIG. 2 |
| 456963 | 5/1949 | Canada | 416/DIG. 2 |
| 601246 | 11/1925 | France | 416/DIG. 2 |

OTHER PUBLICATIONS

Airplane Propeller Principles Nelson 9/1944.

*Primary Examiner*—Carl D. Price
*Assistant Examiner*—John T. Kwon
*Attorney, Agent, or Firm*—Herbert Dubno; Andrew Wilford

[57] ABSTRACT

A propeller is used to displace a vehicle at a reduced speed but with a high slip of approximately at least 60% and has a quality coefficient of at least 70% for 100% slip. The ratio of the diameter of the propeller to its pitch is approximately 1.18 to 2.9 times the value of the quality coefficient, and the blade width of the propeller is 0.09 to 0.19 times the pitch of the propeller. The propeller pitch is substantially constant and the aerodynamic center of pressure is located at a distance from the propeller axis of rotation equl to approximately ¾ of the propeller radius. The radius of the curvature of the leading propeller edge, when seen in cross section, is to approximately ¼ to ⅓ of the greatest blade thickness. In addition the angle of the blade inclination decreases continuously as the propeller diameter increases and the blade thickness is greatest in the leading third of the blade width, relative to the normal rotation direction of the propeller.

4 Claims, 1 Drawing Sheet

AIR PROPELLER

CROSS REFERENCE TO RELATED APPLICATION

This is a continuation-in-part of co-pending application Ser. No. 916,813, filed on Oct. 8, 1984, which is a continuation-in-part of Ser. No. 641,451, filed Aug. 16, 1984, now both abandoned.

FIELD OF THE INVENTION

The present invention relates to an air propeller. More particularly this invention concerns such a propeller for a slow vehicle where the propeller operates with high slip of at least 60% and a quality coefficient or figure of merit of at least 70% for 100% slip.

BACKGROUND OF THE INVENTION

When an air propeller is itself driven and is used as the propulsion system for a watercraft, helicopter, or land vehicle it is a so-called negative propeller. In such usage it is converting the mechanical energy applied as torque about an axis into relative axial thrust between the propeller and the fluid mass surrounding it. When used to drive a generator, as for example in a system for exploiting wind energy, it is termed a positive propeller and in effect converts the axial thrust of the surrounding fluid mass into rotation of the propeller shaft.

Negative propellers are particularly suitable for moving watercraft on small, shallow inland waterways, rivers, canals and the like, since these channels are usually so shallow that use of a standard submerged propeller or paddlewheel would be impossible. In addition such small-draft vehicles create little wake and therefore do little damage to the banks of the waterway. Thus large areas of economic importance, which due to reduced water depth of the rivers over stretches of many thousand of kilometers are not normally navigable or are navigable only by uneconomical screw- or wheel watercraft, become passable to watercraft. Furthermore such a negative propeller is the ideal drive system for a slow land vehicle which must move over terrain where traction may be very low. Positive propellers are used to drive generators intended to overcome the energy shortage.

Most current propeller work is done in airplane propellers, as such must operate with the greatest possible efficiency to economize fuel. The quality coefficient is not important for such airplane usage. When such propellers are used to drive either as positive propellers to drive a generator continuously or as negative propellers to move a landcraft or watercraft, the slip must frequently be much more than 60%, that is the relative displacement of the propeller and the fluid mass it is in will only be six-tenths that it would be if the propeller operated with no slip like a screw in a piece of wood. In this case the figure of merit or quality coefficient must be as great as possible, and the efficiency of the propeller is of secondary importance. This is also true in a helicopter where 100% slip is required for hovering, even if some efficiency is needed when the propeller is tipped to move the vehicle horizontally.

Since, however, propellers are invariably designed with efficiency as the primary consideration, propellers are not generally used in these high-slip applications like moving land and watercraft at slow but varying speed against varying resistance and driving a generator continuously but at very low speed from a propeller subject to winds of widely varying speeds.

OBJECTS OF THE INVENTION

It is therefore an object of the present invention to provide an improved air propeller.

Another object is the provision of such an air propeller which overcomes the above-given disadvantages, that is which is particularly suited for use with high slip.

SUMMARY OF THE INVENTION

The propeller according to the invention is used to displace a vehicle at a reduced speed but with a high slip of approximately at least 60% and has a quality coefficient of at least 70% for 100% slip The ratio of the diameter of the propeller to its pitch is approximately 1.18 to 2.9 times the value of the quality coefficient, and the blade width of the propeller is 0.09 to 0.19 times the pitch of the propeller.

According to this invention the propeller pitch is substantially constant and the aerodynamic center of pressure is located at a distance from the propeller axis of rotation equal to approximately $\frac{3}{4}$ of the propeller radius. The radius of curvature of the leading propeller edge, when seen in cross section, is approximately $\frac{1}{4}$ to $\frac{1}{3}$ of the greatest blade thickness. In addition the angle of the blade inclination decreases continuously as the propeller diameter increases and the blade thickness is greatest in the leading third of the blade width, relative to the normal rotation direction of the propeller.

The radius of curvature of the leading edge when seen in cross section according to the invention is greater than the radius of curvature of the trailing edge and the radius of curvature of the trailing edge is smallest in the area of approximately the outermost third of the propeller. Furthermore the radius of curvature of the trailing edge has always approximately the same value in the area of the outer half of the propeller.

In accordance with a further feature of this invention the shape of the suction surface when seen in a cross section is an essentially straight line in the area between the region of greatest blade thickness and the trailing edge. Thus the total effective suction surface is increased. This is important especially in cases where low rotational speeds of the propeller are employed.

The tests carried out with the propeller according to the invention have yielded remarkable results. A vehicle having a distance between axles of 3.0 m, a 500 cm$^3$ engine and a propeller according to the invention with a diameter of only 1.5 m at a head wind of 50 km/h developed a travel speed of 70 km/h and took a 5–10% slope with a speed of 50 km/h without a running start. Further, a tugboat with an engine of 100 HP and a 5 m diameter propeller according to the invention was able to tow a deadweight barge of 650 metric tons at a deadwater velocity of 7.5 km/h. Research activity carried out in this connection has shown that in the case of deadweight barges with a cargo up to 200 metric tons propeller propulsion according to the present invention is superior and more economical than propulsion by a standard submerged screw. Thus for instance a self-propelled craft with a cargo with 150 metric tons and an 80 HP engine travels with a dead-water speed of 11 km/h when using a 5 m-diameter air propeller according to the invention.

Thus it can be concluded that with the propeller according to the invention a considerably higher pushing force or thrust can be achieved than with an airplane propeller of comparable size. In addition, due to the construction of the propeller according to the invention a considerable propeller velocity results, so that the traction power of the propeller is only minimally influenced by strong headwinds, that is by a negative wind stream.

This invention makes possible, for instance in the case of application of the propeller to land vehicles, the elimination of a number of mechanical components (drives, gear-boxes, differentials, cardan axles, universal joint shafts, etc.) and thereby simplifies the construction and reduces the weight of the vehicle. In spite of the relatively small dimensions of the propeller, the vehicle can travel on almost any difficult terrain and is not influenced by head winds. In cases where the propeller according to the invention is used on helicopters or other vertical take-off vehicles, the propeller can provide improved climb power and horizontal speeds due to the high figure of merit.

DESCRIPTION OF THE DRAWING

The above and other features and advantages will become more readily apparent from the following, reference being made to the accompanying drawing in which.

SPECIFIC DESCRIPTION

Figure 1:
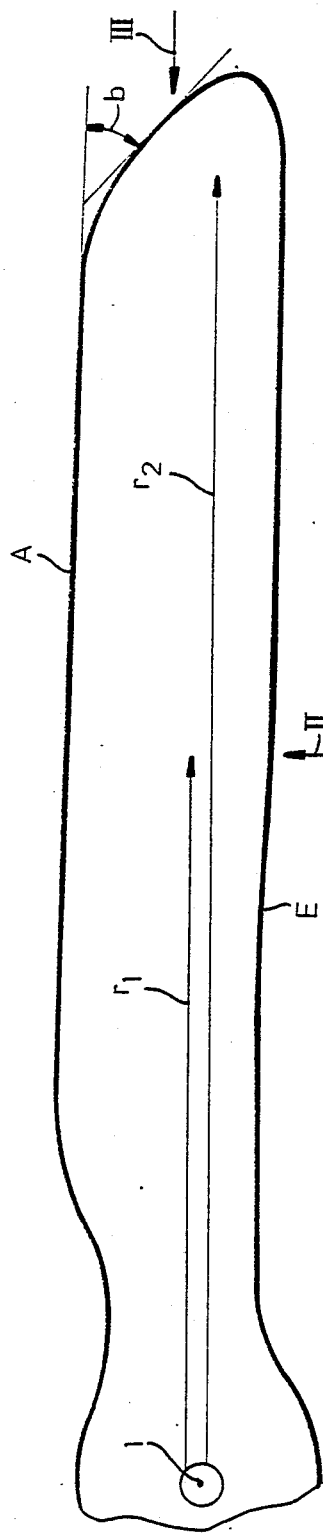
FIG. 1 is an axial view of half of a propeller according to this invention.
Figure 2:
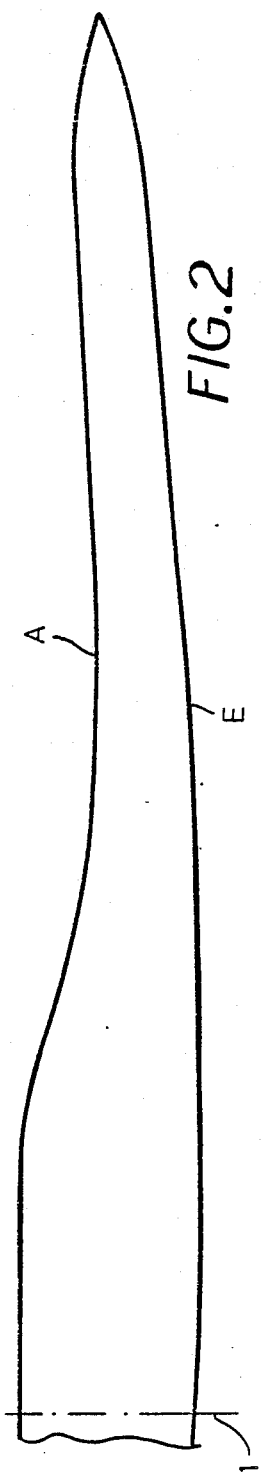
FIG. 2 is a side view taken in the direction of arrow II of FIG. 1.
Figure 3:
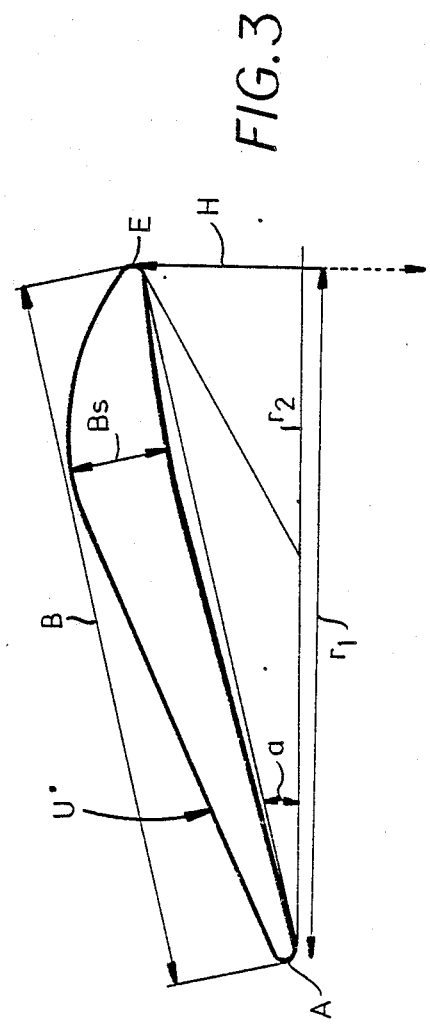
FIG. 3 is an end view taken in the direction of arrow III of FIG. 1.

As seen in FIGS. 1 through 3 the propeller according to this invention is centered on and rotatable about a propeller axis 1 and has a leading edge E extending almost perfectly radially of the axis 1 and a trailing edge A generally parallel to the leading edge E. The angle b formed at the outer end of the propeller half is between 40° and 55°.

FIG. 3 shows the chord or width B of the blade measured in the area of the aerodynamic center of pressure and the thickness Bs, the latter being at its highest value in the leading third of the blade starting from the leading edge E. The propeller blade forms an angle a with a plane running perpendicular to the axis 1 and has a diameter D (not shown) equal to twice its radius $r_2$. The pitch which is the theoretical displacement of the propeller during one rotation presuming that there is no slip.

The above-mentioned quality coefficient or figure of merit $\overline{N}$ is the the power ratio of the propeller when stationary with a slip of 100% and the efficiency is the propeller power ratio when in full motion. The slip is the relative deviation between the actually reached and the theoretically reachable speed and corresponds to the difference between the theoretical and actual speed, inversely proportional to the theoretical speed. The effective quality coefficient $\overline{N}$ can be calculated according to the Bendeman formula:

$$\overline{N} = S/(2p/gFL^2)^{\frac{1}{2}}$$

where
S = the effective thrust in [N] or [kg.m.sec$^{-2}$],
p/g = the mass of 1 m$^3$ of air [kg.m$^{-3}$],
F = the propeller disk area in m$^2$,
L = the power input in [W] or [kg.m$^2$sec$^{-3}$].

The efficiency coefficient $\eta$ is equal to:
$\eta = S.v./R$
where
S = the propeller thrust in [N] or [kgm.sec$^{-2}$],
v = the speed of the vehicle in [m/sec] and
R = the power input of the propeller in [W] or [kgm$^2$.sec$^{-3}$],
where
kg means kg mass and
N means Newton and
W means Watt
m means meter
sec means second According to the invention the proportions in a propeller must be selected so that the ratio of the propeller diameter D to its pitch H is approximately between 1.18 to 2.9 times the quality coefficient $\overline{N}$ and the blade width B of the propeller corresponds to 0.09 to 0.19 times the pitch H. When using the propeller according to the invention to drive a barge or the like and also for any other vehicle with low speed and high slip, the proportions are at the upper limit of the diameter/pitch ratio. The lower ratio range is more suitable when the vehicles are supposed to move quickly, and also when they are supposed to move slowly but continuously. The ratio of the blade width B to pitch H is important inasmuch as the speed increases with increasing blade width. The construction of the propeller according to the invention creates the advantage that even with considerable decreases of the slip as a result of head winds the static thrust force does not decrease correspondingly.

Since there is high slip even when moving against a head wind, going uphill, or for other reasons working against an impediment which normally cause a considerable reduction of the slip, the propeller according to this invention can be fairly small. Up to now, in order to maintain the tractive power in conditions of reduced slip and reduced speed it was necessary to substantially increase the diameter of the propeller. Since the other dimensions had to be increased also, this lead to quite unfavorable ratios of diameter to pitch and blade width to pitch.

The propeller according to invention and shown in the drawing has proportions such that the aerodynamic center of pressure is located at a distance from the center of the propeller which equals approximately three quarters of the propeller radius $r_2$.

As seen best from FIG. 3, the radii of curvature of the leading edge E correspond to approximately a quarter to a third of the greatest blade thickness Bs. Seen in cross section, the radius of curvature of the leading edge E is bigger than the radius of curvature of the trailing edge A, and the radius of curvature of the trailing edge A is smallest approximately in the area of the outermost third of the propeller. Further the proportions are so selected that the radius of curvature of the trailing edge A is fairly constant in the area of the outer half of the propeller. When the propeller is shown in cross section, the outline U of the suction surface in the area between the greatest blade thickness BS and the trailing edge A is an essentially straight line, as shown in FIG. 3.

In the following an embodiment of the propeller according to the invention for the propulsion of a ship is given. A drive motor with an output of 116 HP and 3400 RPM is used to drive this propeller. A stepdown transmission is employed between the motor and the propeller so that the drive speed of the propeller is 1100 RPM.

For this application an axial hub length of 200 mm, a diameter of 3500 mm, and a ratio of D to H of 2.12 was selected. Under these conditions and taking into consideration the fact that B/H=0.09 to 0.19, meaning that when H=1650, B=148.5 to 313.5, the data of the propeller calculated in the common manner were the following:

TABLE

| Radius mm | Blade angle ° ' | | Blade width mm B | Project'n mm P | Blade thickness mm $B_S$ |
|---|---|---|---|---|---|
| 0 | — | — | — | — | (177) |
| 400 | 33 | 18 | 262 | 219 | 92 |
| 600 | 23 | 37 | 240 | 219 | 72.5 |
| 800 | 18 | 11 | 232 | 219 | 57.5 |
| 1000 | 14 | 44 | 227 | 219 | 46 |
| 1200 | 12 | 12 | 224 | 219 | 36.5 |
| 1300 | 11 | 25 | 224 | 219 | 32.1 |
| 1400 | 10 | 37 | 223 | 219 | 29 |
| 1600 | 9 | 19 | 221 | 218 | 21.5 |
| 1700 | 8 | 50 | 115 | 114 | 10 |
| 1750 | — | — | — | — | — |

In another embodiment the propeller had a diameter D of 700 mm, a pitch H of 393 mm, a blade width B in the center of 55 mm, and a hub height of 45 mm. Measurements with this propeller have indicated that at 500 RPM a specific thrust of 53 N/HP is reachable and the propeller at 1 HP input can develop a thrust force of 20 N. These measurement readings already show that in the case of a larger propeller with lower number of rotations an essentially higher value of thrust can be reached than an airplane propeller 10 N/HP).

I claim:

1. In a drive system for propelling a land or water vehicle at a reduced speed by rotation of a propeller in the air with a high slip of approximately at least 60% and having a quality coefficient of at least 70% for 100% slip, the improvement wherein
   the propeller is of substantially constant pitch;
   the propeller is rotated about an axis and the aerodynamic center of pressure is located at a distance from the propeller axis equal to approximately three-fourths of the radius of the propeller;
   the angle of the blade inclination decreases continuously as the diameter of the propeller increases;
   the thickness of the blade is greatest in the leading third of the width of the blade;
   the propeller has a leading edge and a trailing edge and the leading edge has a radius of curvature that is greater seen in cross section than the radius of curvature of the trailing edge, the radius of curvature of the trailing edge being smallest in the area of approximately the outermost third of the propeller;
   the propeller has a suction surface that has a shape when seen in cross section that is an essentially straight line in the area between the region of greatest blade thickness and the trailing edge;
   the ratio of the diameter of the propeller to its pitch is approximately 1.18 to 2.9 times the value of the quality coefficient; and
   the blade width of the propeller is 0.09 to 0.19 times the pitch of the propeller, the pitch being the axial propeller displacement with no slip.

2. The air propeller defined in claim 1 wherein the radius of the curvature of the leading propeller edge, when seen in cross section, is approximately ¼ to ⅓ of the greatest blade thickness.

3. The air propeller defined in claim 1 wherein the radius of curvature of the trailing edge has always approximately the same value in the area of the outer half of the propeller.

4. A method of driving a vehicle at a reduced speed, the method comprising:
   rotating in the air adjacent the vehicle a propeller about an axis and at a speed such that it has a high slip of approximately at least 60% and a quality coefficient of at least 70% for 100% slip, the propeller having a ratio of diameter to pitch equal to approximately 1.18 to 2.9 times the value of the quality coefficient and a blade width equal to 0.09 to 0.19 times the pitch of the propeller, the pitch being the axial displacement during one rotation with no slip.

* * * * *